United States Patent [19]
Osakada et al.

[11] Patent Number: 5,521,796
[45] Date of Patent: May 28, 1996

[54] LIGHT CONDUCTING PLATE FOR SURFACE LIGHT SOURCE DEVICE AND METHOD FOR THE MANUFACTURE THEREOF

[75] Inventors: Hiromi Osakada, Tokyo; Takaaki Katakura, Yokohama, both of Japan

[73] Assignee: Taiho Industries Co., Ltd., Tokyo, Japan

[21] Appl. No.: 309,490

[22] Filed: Sep. 22, 1994

[51] Int. Cl.$^6$ ........................................................ F21V 8/00
[52] U.S. Cl. ................................................ 362/31; 362/330
[58] Field of Search ................................ 362/26, 31, 330; 359/49

[56] References Cited

U.S. PATENT DOCUMENTS 5,130,898  7/1992  Akahane ................................. 362/31
5,349,503  9/1994  Blonder et al. ......................... 362/31

Primary Examiner—Denise L. Gromada
Assistant Examiner—Sara Sachie Raab
Attorney, Agent, or Firm—Oblon, Spivak, McClelland, Maier & Neustadt

[57] ABSTRACT

A light conducting plate for a surface light source device wherein a linear light source is disposed at a light entrance edge at at least one end of a light conducting plate whose one surface is provided with a reflecting layer and whose other surface is defined as a light-emitting surface. The light of the linear light source is scattered within the interior of the light conducting plate by the reflecting layer and emitted from the light-emitting surface. The light conducting plate for a surface light source device is constituted by forming the reflecting layer by moving a bit along the surface of the light conducting plate to be formed with the reflecting layer while pressing it thereon at a negative rake angle to continuously form hole-like pits of random depth and width by fracturing of the surface to be formed with the reflecting layer as a result of exceeding its elastic limit, and forming a plurality of the pit rows in which the pits are continuously aligned.

7 Claims, 2 Drawing Sheets

LIGHT CONDUCTING PLATE FOR SURFACE LIGHT SOURCE DEVICE AND METHOD FOR THE MANUFACTURE THEREOF

BACKGROUND OF THE INVENTION

1. Field of the Invention

This invention relates to a light conducting plate for a surface light source device, which light conducting plate enables a high luminance to be obtained with unlimited uniformity over the entire surface thereof, and to a method for the manufacture of the light conducting plate.

2. Description of the Prior Art

Liquid crystal displays have made spectacular advances in recent years and are now utilized in a wide range of fields including the office automation sector, television receivers, automotive related sectors, the communications equipment sector, and advertising displays. Since liquid crystal is not self-illuminating, the display was initially read using reflected light but because of the very poor visibility by this method, backlit display devices made visible using transmitted light have become the mainstream and are in wide use. As the light source of the transmitted light in such a backlit display, there is used a so-called back light. Back lighting includes the under lighting system in which a fluorescent tube is disposed below a diffusion panel as a linear light source and various techniques are implemented in an attempt to secure a uniform surface light source, and the edge lighting system in which a fluorescent tube is disposed at the edge of a light conducting plate as a linear light source and various techniques are implemented for obtaining a surface light source by uniformly projecting on and emitting from the upper surface of the light conducting plate the light received through the edge thereof.

In general, the under lighting system is bright but has a thick light conducting plate, while the edge lighting system is characterized in being darker but having a thinner light conducting plate than the under lighting system. The system to be used is selected according to the application.

Further, a reflecting layer is formed on one surface of the light conducting plate for obtaining uniform luminance of the light-emitting surface and it is well known to form the reflecting layer by the method of printing a dot pattern using ink having light reflection and diffusion property. By this printing method, however, since a part of the light transmitting through the light conducting plate is absorbed by the ink itself, the light utilization efficiency is decreased by a corresponding amount. Moreover, an ink drying step is required after the printing. In addition, the product quality is hindered and the value of the product diminished should, for example, minute dust particles adhere to the undried ink during printing or drying or should a part of the ink peel off, and there is therefore the drawback of extremely low yield.

Methods were thus found for cutting multiple grooves in the light conducting plate by subjecting the surface of the light conducting plate formed with the reflecting layer to machine processing or molding processing, and various configurations have been proposed.

In the prior art light conducting plate for a surface light source device cut with such grooves, however, if the grooves are formed in the direction perpendicular to the direction of light transmission, while some degree of luminance can be obtained at positions where the distance from the linear light source to the groove is short, only very low luminance can be obtained at positions where the distance from the linear light source to the groove is long, because the reflecting surfaces of the grooves near the linear light source hinder the transmission of the light, with the result that uneven luminance arises over the entire surface of the light conducting plate. When the grooves are cut to pass in the direction of light transmission, moreover, the luminance is extremely low because the grooves scatter almost no light in the direction of the light emitting surface.

Thus while technology has been proposed for a light conducting plate formed with a light scattering layer by cutting grooves, the actual situation is that it has not been reduced to a practical product because of extremely low luminance and the occurrence of uneven luminance.

As a result, a need is felt for a light conducting plate for a surface light source device which does not employ a method of printing a dot pattern using ink, which is further capable of unlimited uniformity over the entire surface of the light conducting plate, and which is further able to provide luminance equal to or higher than a light conducting plate printed with a dot pattern.

This invention was accomplished in light of the aforesaid earlier defects and also for responding to a long felt need, and has as its object to provide a light conducting plate for a surface light source device which, though not printed with a dot pattern, has a luminance equal to or higher than a light conducting plate printed with a dot pattern, and a method for the manufacture thereof.

SUMMARY OF THE INVENTION

For achieving the aforesaid object, this invention relates to a light conducting plate for a surface light source device wherein a linear light source is disposed at a light entrance edge at at least one end of a light conducting plate whose one surface is provided with a reflecting layer and whose other surface is defined as a light-emitting surface, the light of the linear light source being scattered within the interior of the light conducting plate by the reflecting layer and emitted from the light-emitting surface, the light conducting plate for a surface light source device being constituted by forming the reflecting layer by moving a bit along the surface of the light conducting plate to be formed with the reflecting layer while pressing it thereon at a negative rake angle to continuously form hole-like pits of random depth and width by fracturing of the surface to be formed with the reflecting layer as a result of exceeding its elastic limit, and forming a plurality of the pit rows in which the pits are continuously aligned, and a method for the manufacture thereof.

By the method for the manufacture of the light conducting plate according to the invention, a number of pit rows equal to the number of bits can be simultaneously formed in parallel with high precision by disposing a plurality of bits in a line and moving the bits along the surface of the light conducting plate as they are pressed thereon, and since the light of the linear light source can be transmitted reliably and efficiently from one end to the other end owing to the fact that the rows of countless hole-like pits scatter the light passing through the interior of the light conducting plate very effectively and, further, that the pit rows are aligned in the direction of advance of the light passing through the interior of the light conducting plate, the entire light-emitting surface of the light conducting plate assumes a state of unlimited uniformity and the luminance becomes equal to or higher than that of a light conducting plate printed in a dot pattern with ink.

DESCRIPTION OF THE PREFERRED EMBODIMENT

Figure 1:
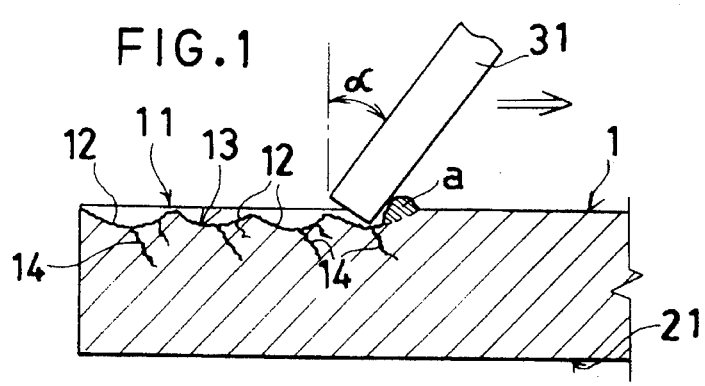
FIG. 1 is an enlarged longitudinal sectional view showing a step for manufacturing the light conducting plate of the present invention.
Figure 2:
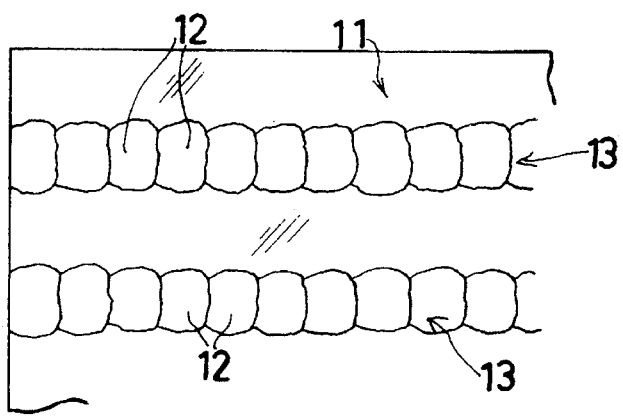
FIG. 2 is an enlarged plan view showing the state in which pit rows are formed by the step of FIG. 1.
Figure 3:
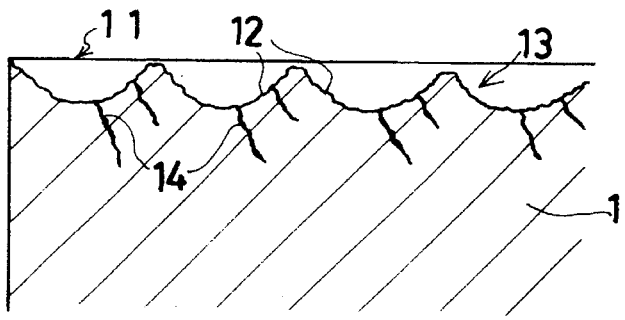
FIG. 3 is an enlarged longitudinal sectional view showing a pit row formed by the step of FIG. 1.
Figure 4:
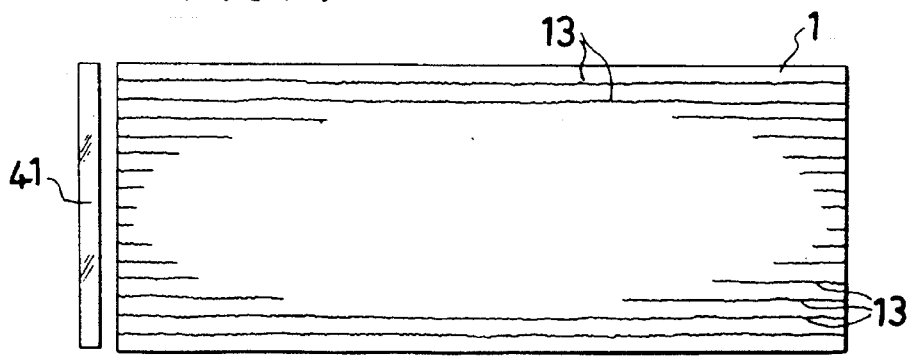
FIG. 4 is a simplified plan view showing an embodiment of a surface light source device employing the light conducting plate of this invention.

FIG. 1 shows the basic configuration in the case of manufacturing a surface light source device light conducting plate 1 of this invention and FIGS. 2-4 show an embodiment of the light conducting plate of this invention, one surface of the light conducting plate 1 being constituted as a reflecting layer 11 and the other surface as a light-emitting surface 21.

The aforesaid reflecting layer 11 is constituted by continuously forming hole-like pits 12 in the light conducting plate 1 so as to provide one surface of the light conducting plate 1 with a plurality of parallel pit rows 13 consisting of the aforesaid pits 12 aligned in rows.

As shown in FIG. 1, for forming pits 12 and a pit row 13 of the reflecting layer 11, a bit 31 is set to a negative rake angle and moved along one surface of the light conducting plate 1 in the direction of the arrow in FIG. 1, in either a straight or snaking manner, while being pressed thereon.

In the foregoing, while the negative rake angle α of the bit 31 differs depending on the material and hardness of the light conducting plate 1 and the hardness and elastic force of the bit 31, if the negative rake angle is too large, the light conducting plate will be softened and fused by the heat resulting from rubbing friction between the bit 31 and the light conducting plate 1, whereby the cut surface will become smooth. Further, if the negative rake angle is near zero degree, shear-cutting occurs, whereby a smooth groove which is not formed with irregularities or cracks is formed in the cut surface. Therefore, since in either of the foregoing cases no light scattering layer effect for improving the luminance of the light conducting plate 1 is formed, the effective negative rake angle in the present invention is in the range not exceeding 60 degrees and is preferably 20–45 degrees.

When the bit 31 is moved along one surface of the light conducting plate 1 while being pressed thereon at a negative rake angle, the one surface of the light conducting plate 1 is fractured as the elastic limit of the material is exceeded by the bit 31, the high pressure producing a compressed constituent portion a and the constituent portion a being broken and scattered by the elasticity of the bit 31, thus forming a hole-like pit 12. Thus when the bit 31 is moved, compressed constituent portions a are fractured and scattered to continuously produce pits 12, so that a pit row 13 is formed faithfully to the locus of the bit 31. Moreover, the pits 12 are of random depth and width owing to the elastic force of the light conducting plate 1, the pressing force, elasticity and fracture state of the bit 31, and the scatter state of the constituent portion a.

In addition, the inner surface of each of the pits 12 is formed over its entirety with fine irregularities owing to the fracturing action of the bit 31 and the fracture and scattering of the constituent portion a, whereby fine cracks 14 extending in the direction of the interior of said light conducting plate 1 are produced in each pit 12 owing to the fracture and the impact caused by the breaking and scattering of the constituent portion a. These cracks 14 are scale-like and are formed with their surfaces roughly perpendicular to the direction of alignment of the pit row 13 so that they scatter the transmitting light to the light-emitting surface side with good efficiency.

Figure 6:
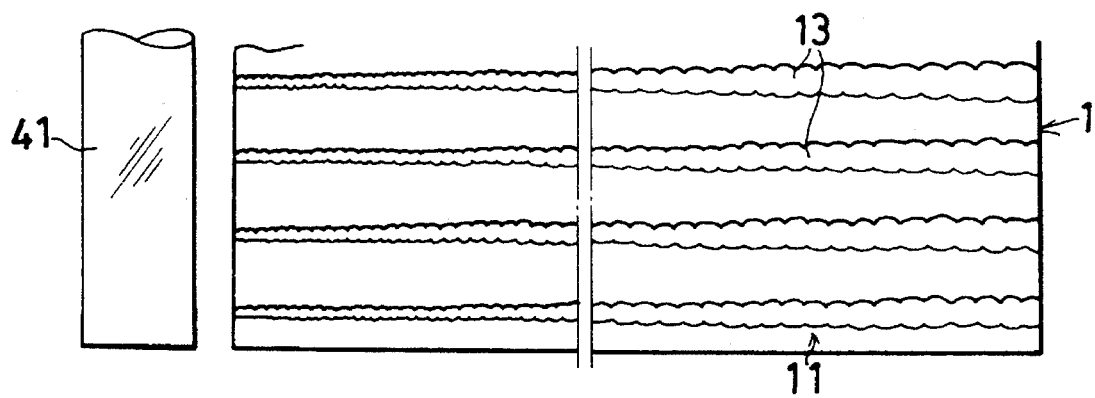
FIG. 6 is an enlarged bottom view showing another embodiment of a surface light source device employing the light conducting plate of this invention.
Figure 7:
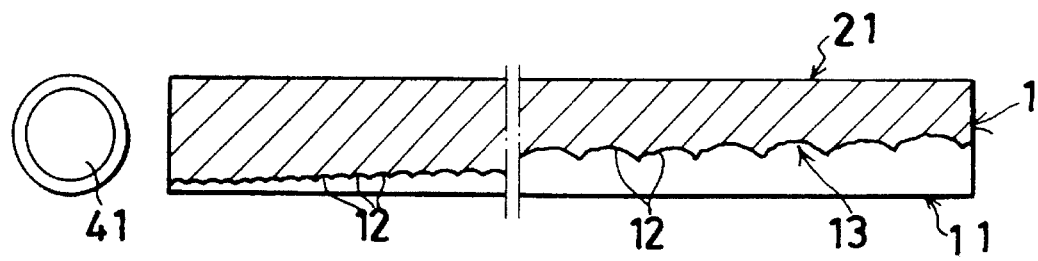
FIG. 7 is an enlarged longitudinal sectional view showing another embodiment of a surface light source device employing the light conducting plate of this invention.

In addition, the depth and width of the pits 12 can be adjusted by the strength of the pressing force acting on the bit 31, the depth of the pits 12 being shallow and the width thereof being narrow when the pressing force is weak and the pits 12 being deep and wide when the pressing force is strong. Therefore, when, as shown in FIG. 6, the pits 12 are made narrow at positions near a linear light source 41 and the pits 12 are made wide at positions far from the linear light source 41, or when, as shown in FIG. 7, the pits 12 are made shallow at positions near the linear light source 41 and the pits 12 are made deep at positions far from the linear light source 41, the light from the linear light source 41 entering from one edge of the light conducting plate 1 and passing through the interior thereof is scattered by the pit rows 13 nearly equally over the entire surface of the linear light source 41, whereby light can be uniformly emitted from the light-emitting surface at high luminance. (The pressing force of the bit 31 can be freely adjusted in the operating cutting device by a computer.)

Figure 8:
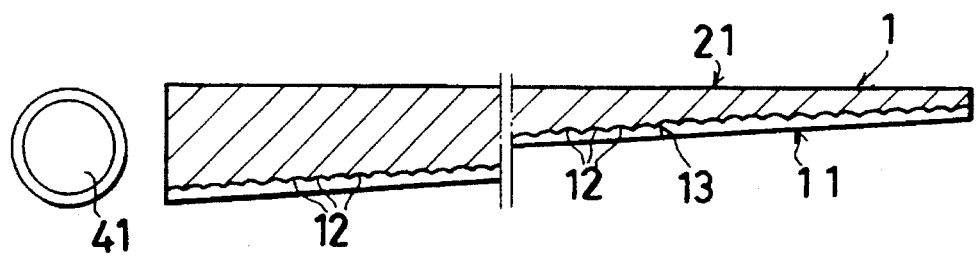
FIG. 8 is an enlarged longitudinal sectional view showing still another embodiment of a surface light source device employing the light conducting plate of this invention.

Further, as shown in FIG. 8, if the end of the light conducting plate 1 where the linear light source 41 is positioned is made thick and the other end is made thin, the linearly transmitting light can be very effectively scattered at the reflecting layer 11.

Figure 5:
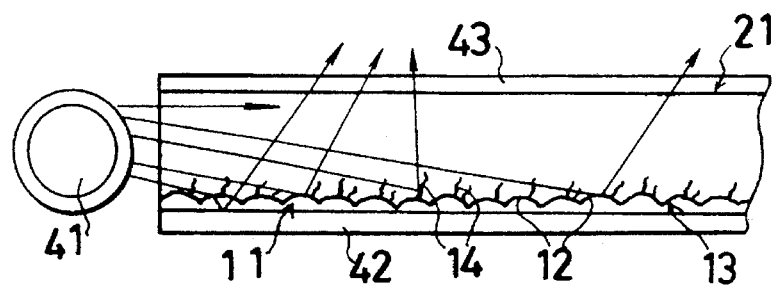
FIG. 5 is an explanatory view showing the state in which light passes through the interior of the light conducting plate of this invention.

In the case where the light conducting plate 1 of this invention is used as a surface light source device, a linear light source 41 is positioned at at least one end and a reflecting panel 42 is provided on the reflecting layer 11 and a dispersion panel 43 on the light-emitting surface 21. Further, when the linear light source 41 is turned on and the light thereof transmits from one end of the light conducting plate 1 through the interior thereof, since the pit rows 13 are formed along the direction of the transmitting light, the transmitting light is scattered by the fine irregularities produced on the inner surfaces of the pits 12 and is also scattered by the fine cracks 14, as shown in FIG. 5, whereby the direction of light scattering is up, down, left, right, diagonally, etc. and is not fixed but random. Moreover, while the transmitting light may be scattered by the half of each pit 12 on the side irradiated by the transmitting light, with no scattering action occurring on the other half of the pit 12, the light exiting from the one half of the pit 12 and reflected by the reflecting panel 42 again enters the other half of a pit 12 to be scattered in random directions and exit from the light-emitting surface 21.

Therefore, the light entering from the edge of the light conducting plate 1 exits from the light-emitting surface 21 after being scattered in every direction by the reflecting layer 11 and, since there is no absorbing portion, the luminance of the light-emitting surface 21 is high and free from the occurrence of unevenness. In addition, even though the pit rows 13 are parallel rows and some space is present between the rows, since the scattered state at the pit row 13 is singularly random as described in the foregoing, no unevenness in luminance extending along the pit rows 13 occurs at the light-emitting surface 21.

The light conducting plate 1 can be manufactured in the desired size in line with the purpose of the surface light source device and, for example, can be manufactured to a thickness of about 0.5–80 mm, a width of about 10–2000 mm and a length of 20–3000 mm using a plate of polymethyl methacrylate.

Further, as the linear light source 41 disposed at one edge of the light conducting plate, a linear light source consisting of a cold-cathode tube and a reflector can be used for a small light conducting plate and one consisting of a hot-cathode tube and a reflector can be used for a medium to large light conducting plate, while there can otherwise be used a row of xenon lamps, argon lamps or the like as the linear light source.

The pit rows 13 are about 5–600 μm in width and 5–500 μm in depth, the distance between the pit rows 13 is 100–1200 μm, and they can be formed over the full length in the longitudinal direction of the light conducting plate 1 or be formed over almost the full length with their ends positioned inward from the opposite ends of the light conducting plate by 1–5 mm.

Although this invention was explained in the foregoing based on an embodiment, this invention is not limited to the aforesaid embodiment but can be worked in any manner insofar as it is not modified from the configuration set out in the claims for patent.

As was explained in the foregoing, this invention relates to a light conducting plate for a surface light source device wherein a linear light source is disposed at a light entrance edge at at least one end of a light conducting plate whose one surface is provided with a reflecting layer and whose other surface is defined as a light-emitting surface, the light of the linear light source being scattered within the interior of the light conducting plate by the reflecting layer and emitted from the light-emitting surface, the light conducting plate for a surface light source device being characterized in that the reflecting layer is formed by moving a bit along the surface of the light conducting plate to be formed with the reflecting layer while pressing it thereon at a negative rake angle to continuously form hole-like pits of random depth and width by fracturing of the surface to be formed with said reflecting layer as a result of exceeding its elastic limit, thus forming pit rows in which he aforesaid pits are aligned, and a method for the manufacture thereof.

Therefore, since the pits of the reflecting layer have countless fine irregularities and cracks and the pits are in continuous rows, the light transmitting through the light conducting plate can be scattered very effectively and, moreover, nearly all of the transmitting light can be emitted from the light-emitting surface, whereby the luminance is extremely high and the luminance can be made to assume a state of unlimited uniformity over the entire surface of the light conducting plate. Since the luminance is therefore uniform and high even with a thin light conducting plate, equipment in the fields of application can be made thin and light in weight, giving them high practical value.

Obviously, many modifications and variations of the present invention are possible in light of the above teachings. It is therefore to be understood that within the scope of the appended claims, the present invention may be practiced otherwise than as specifically described herein.

What is claimed is:

1. A light conducting plate for a surface light source device wherein a linear light source is disposed at a light entrance edge at at least one end of a light conducting plate whose first surface is provided with a reflecting layer and whose other surface is defined as a light-emitting surface, a light of said linear light source being scattered within the interior of the light conducting plate by said reflecting layer and emitted from the light-emitting surface, the light conducting plate for the surface light source device constituted by forming the reflecting layer by continuously forming hole-like pits of random depth and width in the first surface by causing said reflecting layer to fracture as a result of the first surface exceeding an elastic limit of a material of which the plate is formed, and forming a plurality of parallel pit rows in which the aforesaid pits are aligned.

2. A light conducting plate for a surface light source device according to claim 1, wherein the inner surfaces of the pits are formed with fine irregularities throughout.

3. A light conducting plate for a surface light source device according to claim 2, wherein fine cracks extending into the interior of the light conducting plate occur in the pits.

4. A light conducting plate for a surface light source device according to claim 3, wherein said pit rows are aligned along a direction in which the transmitting light advances in the light conducting plate.

5. A light conducting plate for a surface light source device according to claim 1, wherein fine cracks extending into the interior of the light conducting plate occur in the pits.

6. A light conducting plate for a surface light source device according to claim 5, wherein said pit rows are aligned along a direction in which the transmitting light advances in the light conducting plate.

7. A light conducting plate for a surface light source device according to claim 1, wherein said pit rows are aligned along a direction in which the transmitting light advances in the light conducting plate.

* * * * *